United States Patent
Wesolowski

[11] Patent Number: 5,343,301
[45] Date of Patent: Aug. 30, 1994

[54] INPUT CLOCK PRESENCE DETECTOR FOR A DIGITAL VIDEO INPUT

[75] Inventor: Jan S. Wesolowski, Redwood City, Calif.

[73] Assignee: Ampex Systems Corporation, Redwood City, Calif.

[21] Appl. No.: 972,040

[22] Filed: Nov. 5, 1992

[51] Int. Cl.$^5$ .............................................. H04N 5/04
[52] U.S. Cl. .............................. 348/500; 375/110
[58] Field of Search ............ 358/148, 153, 149, 142; 375/110, 108, 106; 371/5.3, 61; H04N 5/04

[56] References Cited

U.S. PATENT DOCUMENTS

| | | | |
|---|---|---|---|
| 4,037,257 | 7/1977 | Chari | 360/51 |
| 4,040,022 | 8/1977 | Takii | 360/51 |
| 4,363,003 | 12/1982 | Osaka et al. | 375/108 |
| 4,363,123 | 12/1982 | Grover | 371/5.3 |
| 4,385,383 | 5/1983 | Karchevski | 371/5.3 |
| 4,385,395 | 5/1983 | Tanaka | 375/110 |
| 4,736,162 | 4/1988 | Ishihara | 358/153 |
| 4,891,565 | 1/1990 | Ten Pierick | 358/148 |
| 4,945,413 | 7/1990 | Merval | 358/153 |

*Primary Examiner*—James J. Groody
*Assistant Examiner*—Chris Grant
*Attorney, Agent, or Firm*—John G. Mesaros

[57] ABSTRACT

A method and apparatus for input data clock presence detection which utilizes an up/down counter clocked by a reference clock, which operates at a nominal frequency rate half of the nominal rate of the input data clock, and an R/S flip-flop causing the up/down counter to count up when set, and to count down when reset. The R/S flip-flop is cleared by the reference clock and set by the input data clock. The counter is selected to count up to its maximum number and remain there when continuously clocked up. Similarly, when continuously clocked down, the counter reaches its minimum number (zero) and remains there. So long as the input data clock is present and has the correct rate, after each reference clock pulse resets the flip-flop and prepares the counter to count down, there is at least one input data clock that sets the flip-flop and prepares the counter to count up. As a result, each reference clock pulse is counted up, and eventually the counter reaches its maximum number indicating presence of the input data clock. In the absence of the input data clock, the R/S flip-flop remains reset, whereupon the reference clock pulses are counted down, and eventually the counter reaches its minimum indicating the absence of the input data clock. A latch is provided for output of the clock presence signal.

6 Claims, 7 Drawing Sheets

INPUT CLOCK PRESENCE DETECTOR FOR A DIGITAL VIDEO INPUT

CROSS-REFERENCE TO RELATED APPLICATIONS

The subject matter of this patent application is related to the subject matter of the following patent applications, all of which are filed concurrently herewith and assigned to Ampex Systems Corporation, the assignee of the present invention, and all of which are the invention of Jan S. Wesolowski, all of such applications being incorporated by reference as though fully set forth herein: (a) patent application entitled "Digital Video Flywheel Circuit Phasing Method and Apparatus" (Ser. No. 07/972,198; (b) patent application entitled "Method and Apparatus for Providing Noise Immunity for an Input Interface of a Digital Video Recorder Ser. No. 07/972,281; and (c) patent application entitled "Method and Apparatus for Detecting Stability of a Digital Component Video Signal Ser. No. 07/972,323; and patent application entitled "Timing Reference Error Detection and Correction Circuit for a Digital Component Video Input Interface" Ser. No. 07/972,029.

FIELD OF THE INVENTION

This invention relates generally to an input data clock presence detector for a digital video input signal of a digital component video input interface.

BACKGROUND OF THE INVENTION

The input video interface of a digital video tape recorder is required to produce several types of signals representative of the timing of the incoming video data. The production of these signals has to continue even if the input data is interrupted or disappears. Several operations of a digital video tape recorder or its input interface should not be performed if the digital video input signal is not present. The digital video signal may be supplied to the input of a digital video tape recorder in form of parallel data which must be accompanied by a clock. Detecting the presence of that clock is preliminary for detecting whether the incoming digital input video data is present.

The typical design of an input data clock presence detector is based on the principle of a retriggerable one shot multivibrator, which time constant is set to be longer than the period of the clock which triggers it. As long as the clock is present, it keeps the multivibrator in its astable state and the detector output in a state corresponding to the clock presence. Disappearance of the clock allows the astable state to expire and the detector output switches to the state corresponding to the absence of the clock. The multivibrator can be implemented as an analog device or a digital circuit. However, the analog version cannot be used inside of a digital application specific integrated circuit (ASIC), and the digital version requires some other clock (reference clock) operating at a higher rate for clocking the digital one shot.

In accordance with an aspect of the invention, there is provided data clock presence detector circuit suitable for implementation inside of a digital ASIC, in which only reference clocks at a rate lower than the data clock rate are available.

SUMMARY OF THE INVENTION

The foregoing and other objects of the invention are accomplished by providing a method and apparatus for input data clock presence detection which utilizes an up/down counter clocked by a reference clock, which operates at a nominal frequency rate half of the nominal rate of the input data clock, and an R/S flip-flop causing the up/down counter to count up when set, and to count down when reset. The R/S flip-flop is cleared by the reference dock and set by the input data clock. The counter is selected to count up to its maximum number and remain there when continuously clocked up. Similarly, when continuously clocked down, the counter reaches its minimum number (zero) and remains there. So long as the input data dock is present and has the correct rate, after each reference clock pulse resets the flip-flop and prepares the counter to count down, there is at least one input data clock that sets the flip-flop and prepares the counter to count up. As a result, each reference clock pulse is counted up, and eventually the counter reaches its maximum number indicating presence of the input data clock. In the absence of the input data clock, the R/S flip-flop remains reset, whereupon the reference clock pulses are counted down, and eventually the counter reaches its minimum indicating the absence of the input data clock. A latch is provided for output of the clock presence signal.

Other objects, features and advantages of the invention will become apparent from a reading of the specification when taken in conjunction with the drawings in which like reference numerals refer to like elements in the several views.

DETAILED DESCRIPTION OF THE PREFERRED EMBODIMENT

General Overview of Deformatter System

Figure 1A:
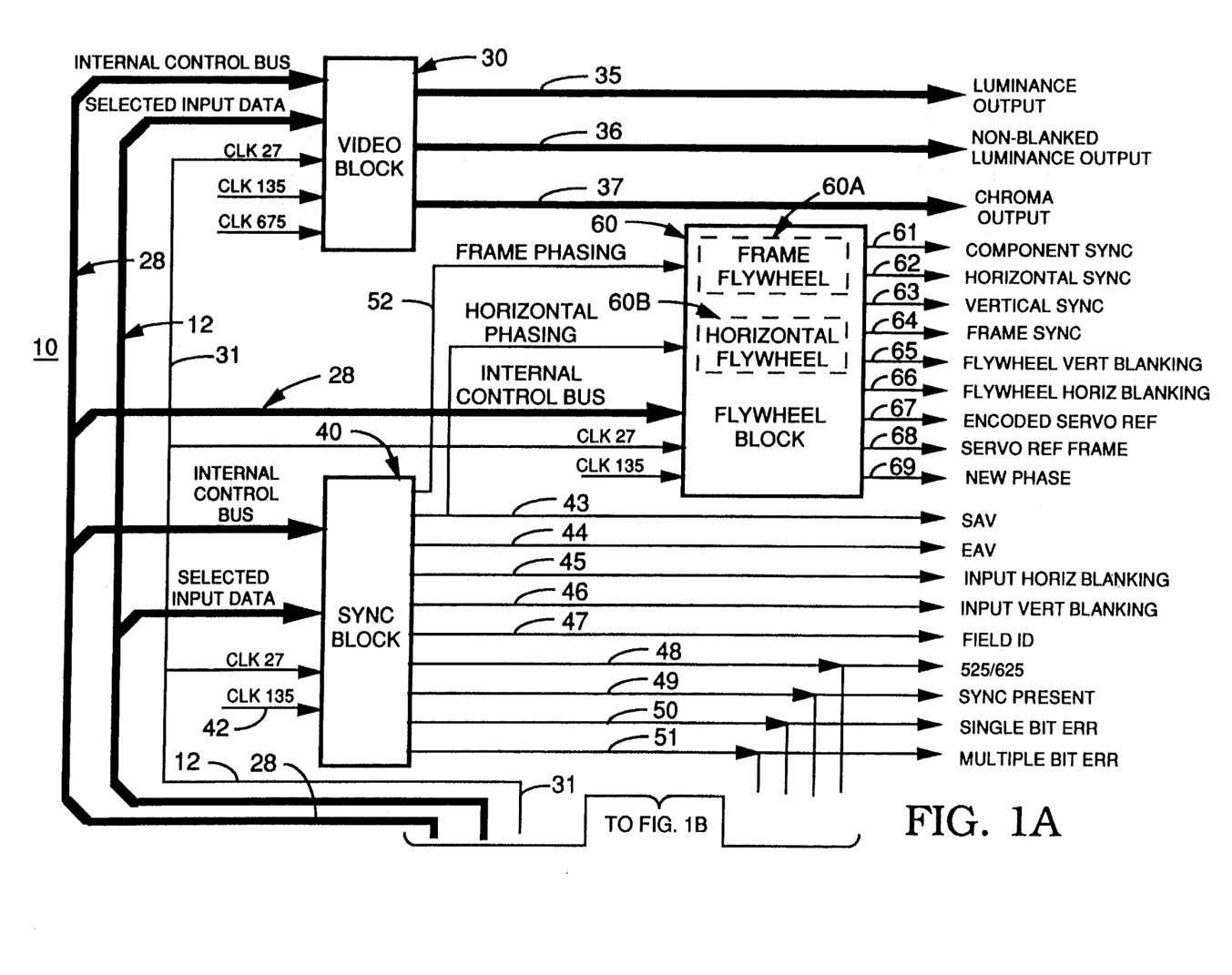
FIGS. 1A and 1B, collectively referred to as FIG. 1, show a block diagram of a component input deformatter system incorporating the system for providing noise immunity for a digital video input interface of a digital video recorder according to the invention.
Figure 1B:
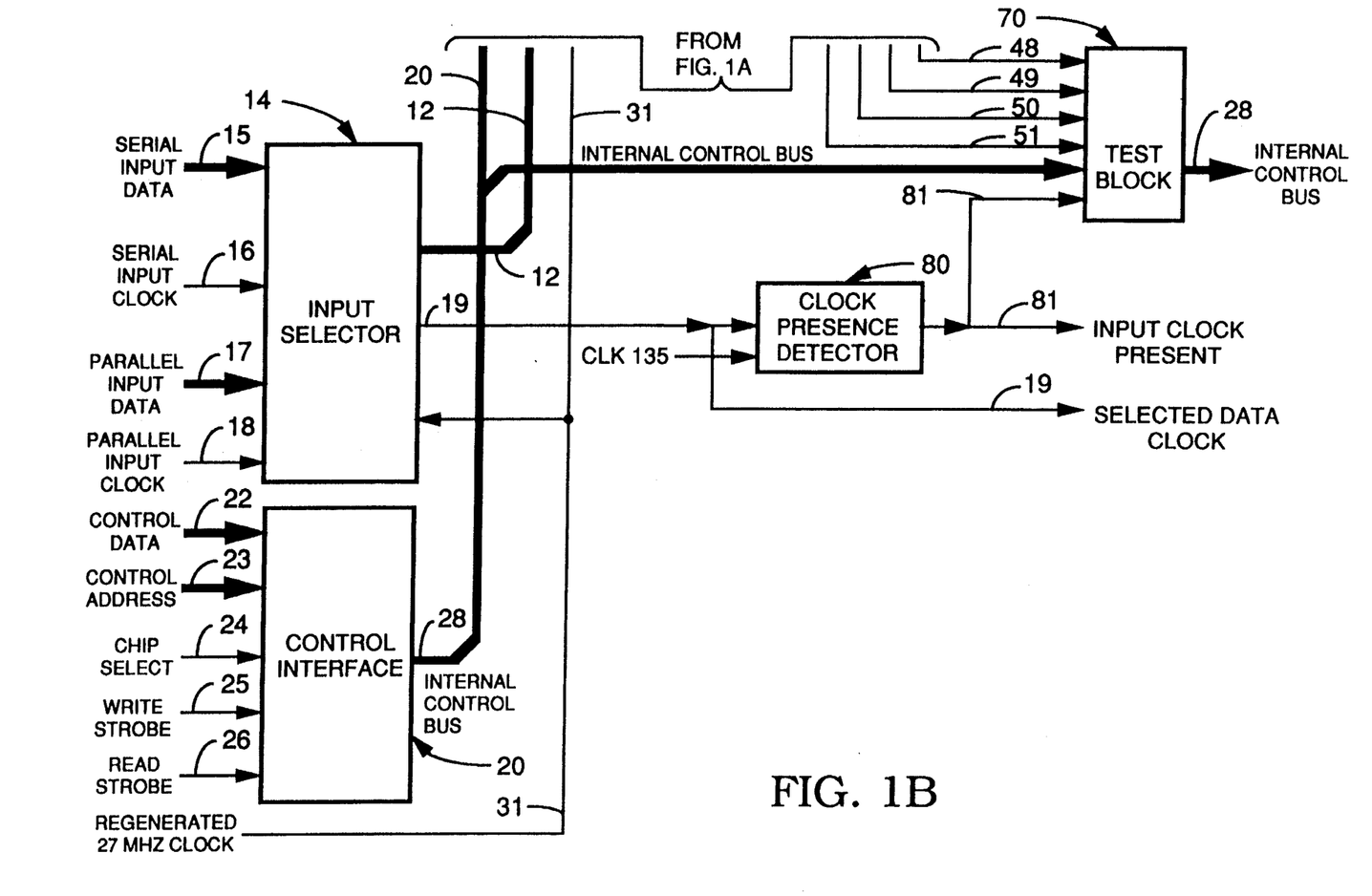

Referring now to the drawings, and particularly to FIG. 1, there is shown a block diagram of a component input deformatter system, generally designated 10, incorporating the system for detecting stability of a digital component video signal for a digital video input interface of a digital video recorder according to the invention. The input deformatter system 10 is the main part of the record side of the video application layer of a video tape recorder. The major circuits of the system 10 include an input selector, generally designated 14, a control interface, generally designated 20, a video block, generally designated 30, a sync block, generally designated 40, a flywheel block, generally designated 60, a test block, generally designated 70, and a clock presence detector, generally designated 80. Although not shown, an audio data block, which forms no part of the invention, is likewise part of the system for processing the audio portion of the incoming signal.

The input selector 14 has four inputs 15–18, respectively designated "Serial Input Data", "Serial Input Clock", "Parallel Input Data", and "Parallel Input Clock". The serial and parallel inputs are 10 lead lines for providing 10 bits of data, while the clock inputs are single leads. The outputs of the input selector 14 include a 10 bit data output bus 12 and a clock line 19.

The control interface 20 has five inputs, an 8 bit control data bus 22, a 7 bit control address bus 23, a chip select lead 24, a write strobe 25 and a read strobe 26. The output of the interface 20 provides signals over an internal control bus 28 which communicates with each of the video block 30, the sync block 40, the flywheel block 60, and the test block 70 (which also communicates with the bus 28 via its output).

For clocking purposes, the input selector block 14 receives a serial input clock on line 16 and a parallel input clock on line 18, the selected clock of which is output on line 19 to clock presence detector 80, which outputs an input clock present signal on lead 81. The selected data clock signal on lead 19, at a nominal frequency of 27 MHz, is delivered to an external phase locked loop including a crystal VCO circuit (not shown in FIG. 1, but shown in FIG. 2B), from which a regenerated 27 MHz clock returns to the deformatter on CLK27 lead 31 for clocking most of the internal system operations. This clock must always be present for proper operation of the System 10. The regenerated 27 MHz clock is also provided over CLK27 lead 31 to each of the video block 30, the sync block 40, and the flywheel block 60. Two other clock signals are provided, these being designated CLK135 and CLK675, respectively, which are derived by two stages of divide-by-two circuitry from the CLK27 clock signal and which can be considered part of the flywheel block 60. CLK135 is an output video data clock, of a 13.5 MHz nominal frequency, and is provided as an input dock signal to the video block 30 over lead 32, to the sync block 40 over lead 42, and to flywheel block 60 over lead 34. Positive going transition of this clock clocks data out. CLK675 is a 6.75 MHz nominal frequency output data clock for chroma demultiplexing and is provided as an input over lead 33 to the video block 30.

The selected input data is also reclocked inside the input selector 14 with the regenerated 27 MHz dock before further use. The reclocking circuit provides relative insensitivity to the phase relationship between input data and the regenerated clock.

The video block 30 extracts only active video from the selected input. It outputs data on three lines 35–37, these signals being, respectively, luminance output, non-blanked luminance output and chroma output. This block does not form a part of the present invention and further discussion thereof is unnecessary.

The sync block 40 receives data inputs from the input selector 14 over line 12 and control signals over internal control bus 28, with the outputs appearing on lines 43–47 being respectively designated SAV (Start of Active Video), EAV (End of Active Video), Input Horizontal Blanking, Input Vertical Blanking, and Field ID. The sync block 40 extracts the sync information from the incoming data over line 12 and provides phasing information for the flywheel block 60 which produces various sync pulses for use both internally—by the system 10, and externally—by other parts of the video tape recorder.

Other output signals appear on leads 48–51, these signals being, respectively, 525/625 (the TV line standard according to which the input data has been generated), sync present, single bit err (error) and multiple bit err (error); the last three of these signals on leads 49–51 are also provided as inputs to the test block 70, which counts them, and the results of counting are sent to the microprocessor 150 (See FIG. 2A) and are utilized, as will be hereafter explained, to determine if the input signal is free, or relatively free, of disturbances to provide a quiescent period during which the flywheel phasing may be enabled.

For making continuous sync information available while input data is absent, the deformatter system 10 provides a sync flywheel function via the flywheel block 60. It is important to emphasize that the sync block 40 extracts sync information from the incoming data so long as there is an incoming signal; however, whether the data is distorted, as a consequence of noise or the like, whether the data is continuous or not, or even if the data disappears, the flywheel block 60 continues to provide sync pulses which are phased to the incoming sync information. For this purpose a frame phasing pulse on line 52, and a horizontal phasing pulse on line 43 are provided from sync block 40 to the flywheel block 60, along with the clock signals on leads 31 and 42, and data from the internal control bus 28.

Shown in broken lines within the flywheel block 60 are two sub-blocks 60a and 60b, respectively designated frame flywheel 60a and horizontal flywheel 60b, with the frame phasing pulse on lead 52 providing an input to the frame flywheel sub-block 60A and the horizontal phasing pulse on lead 43 providing an input to the horizontal flywheel 60B. As will be described hereinafter, with minor exception, these flywheel sub-blocks are generally identical in construction and configuration. The flywheel circuits of flywheel block 60 output a horizontal sync pulse on lead 62, a vertical sync pulse on lead 63, and a frame sync pulse on lead 64, as well as an encoded component sync signal on lead 61 (combined horizontal and vertical sync information), plus two signals made specially for use as servo references: the servo reference frame signal on lead 68, and an encoded servo reference signal (combined 180/200 Hz reference with frame sync information) on lead 67. Timing of the group of flywheeled sync signals relative to the selected input data is determined by phase values preset by the microprocessor and loaded into flywheel counters within flywheel block 60 at a time determined by phasing pulses derived from the input data. The phasing pulses can be enabled or disabled by a microprocessor command. When the microprocessor senses the new phase signal on lead 69 from the flywheel block 60 and determines that re-phasing is required, and if the incoming signal is stable, the phasing pulses are enabled for a short time, within which both phasing pulses are received at least once.

The encoded servo reference signal is TV standard dependent, that is, the frequency of its basic component is 180 Hertz in case of the 525 standard and 200 Hertz in the case of the 625 standard. It is used by the servo system of the video tape recorder during recording, since the scanner and the capstan both have to be synchronized to the incoming video signal and that synchronization is provided through this line.

The test block 70 receives as inputs the aforedescribed signals on leads 48-51 from the sync block as well as input clock present signal from the clock presence detector over lead 81. In addition the input of the test block is coupled to receive signals via internal control bus 28 and to output the signals to the same internal control bus. The test block 70, in part, is used to process the appropriate signals to determine the time during which the incoming signal is relatively free of disturbances, at which time the flywheel phasing is enabled.

The foregoing discussion generally describes the input deformatter system 10, which provides the digital video input interface to a digital video tape recorder. The majority of the components therein are not related to the present invention and are provided as a description of an appropriate environment in which the present invention may be utilized. Likewise, the microprocessor and the VCO, with which the system 10 interfaces, have not been shown in FIG. 1, but are shown in FIG. 2, the description of which follows.

Figure 2A:
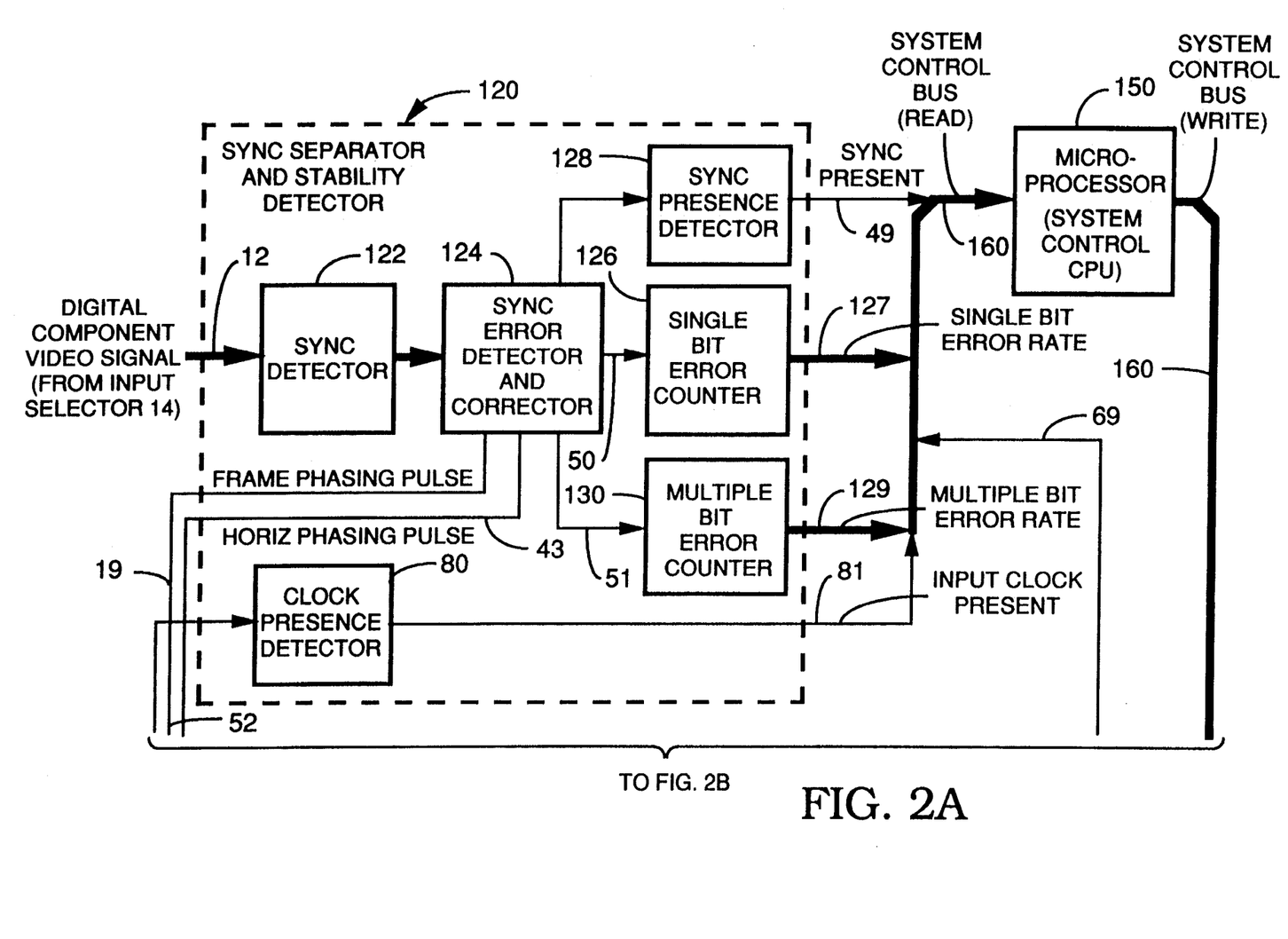
FIGS. 2A, 2B and 2C, collectively referred to as FIG. 2, show a block diagram of the system for providing noise immunity for a digital video input interface of a digital video recorder.
Figure 2B:
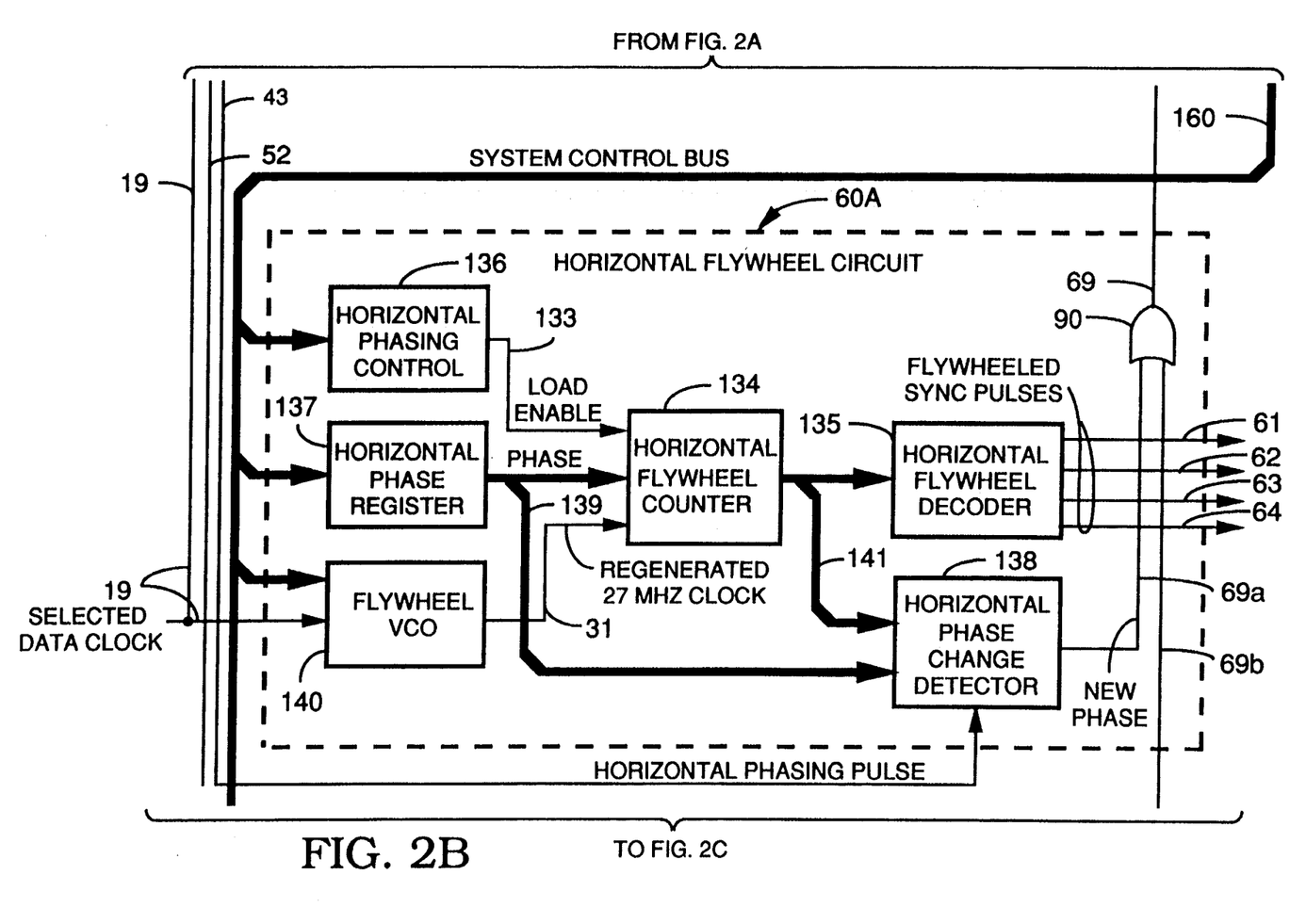
Figure 2C:
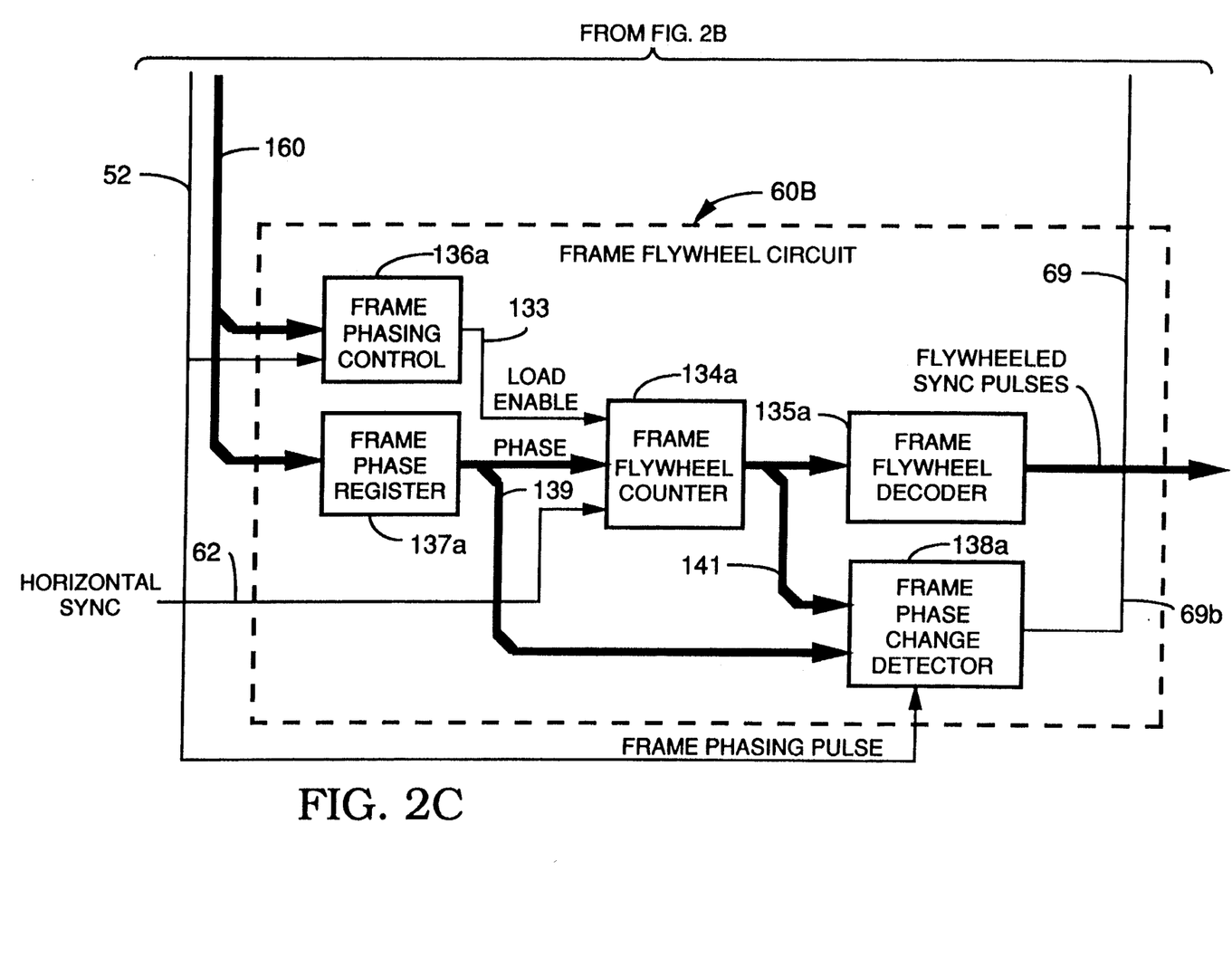

System for Providing Noise Immunity for a Digital Video Input Interface of a Digital Video Recorder By reference to FIG. 2, there is shown a modified block diagram of the invention, in which certain of the component blocks depicted therein are grouped together for ease of discussion, although some of the components, such as those shown in the broken line block 120 (in FIG. 2A), designated sync separator and stability detector, may be found in more than one of the blocks described in FIG. 1. The drawing of FIG. 2 is essentially a compilation of parts or components from the block diagram of FIG. 1 showing only those components which are essential to the method and apparatus for providing noise immunity for the input interface of a digital video recorder operation. For example, within the sync separator and stability detector block 120, the sync detector 122, the sync error detector and corrector 124 and the sync presence detector 128 are functionally located within the sync block 40, while the data clock presence detector 80 is the clock presence detector 80 shown as a separate component in FIG. 1. The single bit error counter 126 and the multiple bit error counter 130 are located within the test block 70 of FIG. 1.

The outputs of the sync separator and stability detector 120 include input clock present line 81, sync present line 49, single bit error rate signal on lead 127, and multiple bit error rate signal on lead 129, the signals on the latter two leads resulting from the single bit error signal and multiple bit error signals on leads 50 and 51, respectively, being transmitted to the respective error rate counters 126 and 130. The counters' outputs are read by the microprocessor 150 as "rates". The signal lines 81, 49, 50 and 51 are designated on FIG. 1, with all being output from the sync block 40, except for the input clock present line 81, which is output from the clock presence detector 80.

A second portion of the block diagram is enclosed in broken lines in FIG. 2B, this portion 60A being generically designated "horizontal flywheel circuit". The blocks identified as the horizontal flywheel counter 134, the horizontal flywheel decoder 135, the horizontal phasing control 136, the horizontal phase register 137 and the horizontal phase change detector 138 are all component parts of the flywheel block 60 of FIG. 1, while the flywheel VCO 140 is completely external to the deformatter system, this VCO being that which has heretofore been discussed in conjunction with the block diagram of FIG. 1. Also shown in FIG. 2A, and external to the deformatter system 10, is the system control CPU or microprocessor 150. Interconnecting the various components is a system control bus, generally designated 160 which, on the input side of the microprocessor 150 is designated "read", and on the output side is designated "write". The deformatter system 10 of FIG. 1 is implemented on an ASIC (application specific integrated circuit) while the microprocessor 150 is external to the system. The system control bus 160 shown in FIG. 2 represents the internal control bus 28 of that ASIC as well as the bus between the deformatter system 10 and the microprocessor 150.

A third portion of the block diagram is enclosed in broken lines in FIG. 2C, this portion 60A being generically designated frame flywheel circuit. The blocks identified as the frame flywheel counter 134a, the frame flywheel decoder 135a, the frame phasing control 136a, the frame phase register 137a and the frame phase change detector 138a are all component parts of the flywheel block 60 of FIG. 1. For synchronization purposes, however, instead of a VCO, for clocking purposes, the horizontal sync signal on lead 62 is provided to the frame flywheel circuit 60A.

Sync Separator and Stability Detector

For operational purposes, several types of timing signals have to be derived from the incoming digital video signal on bus 12 by the input interface of a digital video recorder. These timing signals need to be produced by the flywheel circuits even if the input signal disappears or is not continuous. The flywheel circuits have to be initially phased to the synchronization components of the input video signal and rephased every time a change is detected in the phase relationship between flywheeled signals and the input video signal. Before the phasing of the flywheel circuits is enabled, it must be determined that the video signal is present and stable.

In accordance with the invention, the determination of the presence and stability of the input digital video signal on bus 12 is based on the detected presence of the input data clock (lead 81), the detected presence of timing reference code words, and the detected rate of correctable and uncorrectable errors of timing reference code words in the video signal. The presence and stability of the input digital video signal is determined by the system control microprocessor 150 running a program for periodically reading signals from the input data clock presence detector circuit 80, the circuit detecting presence of timing reference code words in the input digital video signal, and the circuits measuring rates of single-bit and multiple-bit errors in detected timing reference code words. The input signal is determined to be present and stable if the input data clock is present, timing reference code words are present, and if both measured error rates do not exceed some experimentally determined threshold values.

In operation the digital component video signal appearing on bus 12 from the input selector 14 is transmitted to the sync detector 122 of the sync separator and stability detector 120. In the initial state, it is assumed that the flywheel is free running, and it is not phased. The sync separator and stability detector 120 generally processes and monitors the incoming signal to determine certain qualities of the signal. An initial check is to determine, via the clock presence detector 80, whether the selected input data clock (from the input selector 14) is present with the result being signified on output line 81 to the system control microprocessor 150. Correspondingly, the output of the sync detector 122 is provided to the sync error detector and corrector 124, wherein certain processing occurs, that is, single bit errors are detected and corrected, while multiple bit errors are not corrected, and may or may not be detected depending on the size and kind of errors. The results of the processing in the sync error detector and corrector 124 provide outputs to the sync presence detector 128, the single bit error counter 126 and the multiple bit error counter 130. In the sync presence detector 128 a check is made to determine whether the sync is present, with this result being output on lead 49 to the microprocessor 150. The single bit error counter 126 counts the detected occurrences of single bit errors and provides an output indicative of a single bit error rate to microprocessor 150 via a signal on lead 127. Similarly, the multiple bit error input to the multiple bit error counter 130 provides an output indicative of a multiple bit error rate, via lead 129, to the microprocessor 150. This signal processing on the incoming signal on bus 12 is performed over a predetermined time period prior to output of the corresponding signals.

The signal processing operations are being performed on the incoming video signal to, in part, provide a determination as to the error rate present in the sync portion of the incoming data, this information providing an indication as to the quality and stability of the incoming data and the absence of disturbances in the data. Two error checks are performed, for single bit error rate and for multiple bit error rate, with these outputs being provided to the microprocessor 150, along with a signal designated new phase appearing on lead 69 from the phase change detector 138. (The new phase signal on lead 69 is an output of the flywheel block 60 of FIG. 1 and its origin will be described in conjunction with FIGS. 2B and 2C.)

The sync separator and stability detector 120 outputs a frame phasing pulse over lead 52 and a horizontal phasing pulse over lead 43 from the sync error detector and corrector 124, each pulse of which is utilized by the respective flywheel circuit, specifically by the phase change detector 138a or 138, respectively. (These phasing pulses are shown as outputs from the sync block 40 to the flywheel block 60 in FIG. 1A).

Flywheel Circuits

FIGS. 2B and 2C show, respectively, the horizontal flywheel circuit 60A and the frame flywheel circuit 60B, both of which are essentially identical, with the exception of the clocking, that is, a VCO 140 is used to clock the horizontal flywheel circuit 60A, while the horizontal sync pulse on lead 62 clocks the frame flywheel counter 134a of the frame flywheel circuit 60B. In operation, the horizontal phasing pulse on lead 43 is used as an input to the horizontal phase change detector 138 and the frame phasing pulse on lead 52 is used as an input to the frame phase change detector 138a. Each of these phase change detectors can output a new phase signal on lead 69a or 69b, respectively, the two signals being logically ORed via an OR gate 90. The microprocessor 150, after making a determination as to signal stability of the incoming signal as described, transmits the command and control signal information, via the system control bus 160, to both the horizontal flywheel circuit 60A and the frame flywheel circuit 60B, specifically to the phasing controls 136 and 136a, the phase registers 137 and 137a, and to the flywheel VCO 140.

Phasing of the horizontal (and frame) sync flywheel circuit 60A (and 60B) is accomplished by setting the flywheel counter 134 (and 134a) to a predetermined number (phase word via line 139 from the phase register 137 (or 137a)) at the time when the corresponding timing reference code is detected in the digital component video signal on bus 12 and a phasing pulse derived from the timing reference code is delivered to the flywheel circuit. The phase word is usually preloaded by the microprocessor 150 in the phase register 137 (and 137a), from which, at phasing time, it is copied into the flywheel counter 134 (and 134a). Immediately after, the phasing is disabled. Subsequently, provided that the input signal phase didn't change, at each repetition of the same timing reference code the state of the flywheel counter 134 (or 134a) is identical with the phase word. The lack of identity clearly indicates that the input signal phase has changed. This leads to a very simple hardware implementation of the phase change detection, in the form of an identity or phase change detector 138 (or 138a) connected between the flywheel counter 134 (or 134a) and the phase register 137 (or 137a). Output of the phase change detector 138 (and 138a) is made available to the system control microprocessor 150 as a new phase signal on lead 69, either for periodic reading or as an interrupt request signal. In response to this new phase signal on lead the microprocessor 150 enters a flywheel re-phasing procedure.

Clock Presence Detector

Several operations of a digital video tape recorder or its input interface should not be performed if the digital video input signal on bus 12 is not present. The digital video signal may be supplied to the input of a digital video tape recorder in the form of parallel data which must be accompanied by a clock. Detecting the presence of that clock is preliminary for detecting whether the incoming digital input video data on line 12 is present.

The typical design of an input data dock presence detector is based on the principle of a retriggerable one shot multivibrator, the time constant of which is set to be longer than the period of the clock which triggers it. As long as the clock is present, it keeps the multivibrator in its astable state and the detector output in a state corresponding to the dock presence. Disappearance of the dock allows the astable state to expire and the detector output switches to the state corresponding to the absence of the clock. Such a prior art multivibrator can be implemented as analog device or a digital circuit. However, the analog version cannot be used inside of a digital ASIC, and the digital version requires some other clock (reference clock) operating at a higher rate for docking the digital one shot.

Figure 3:
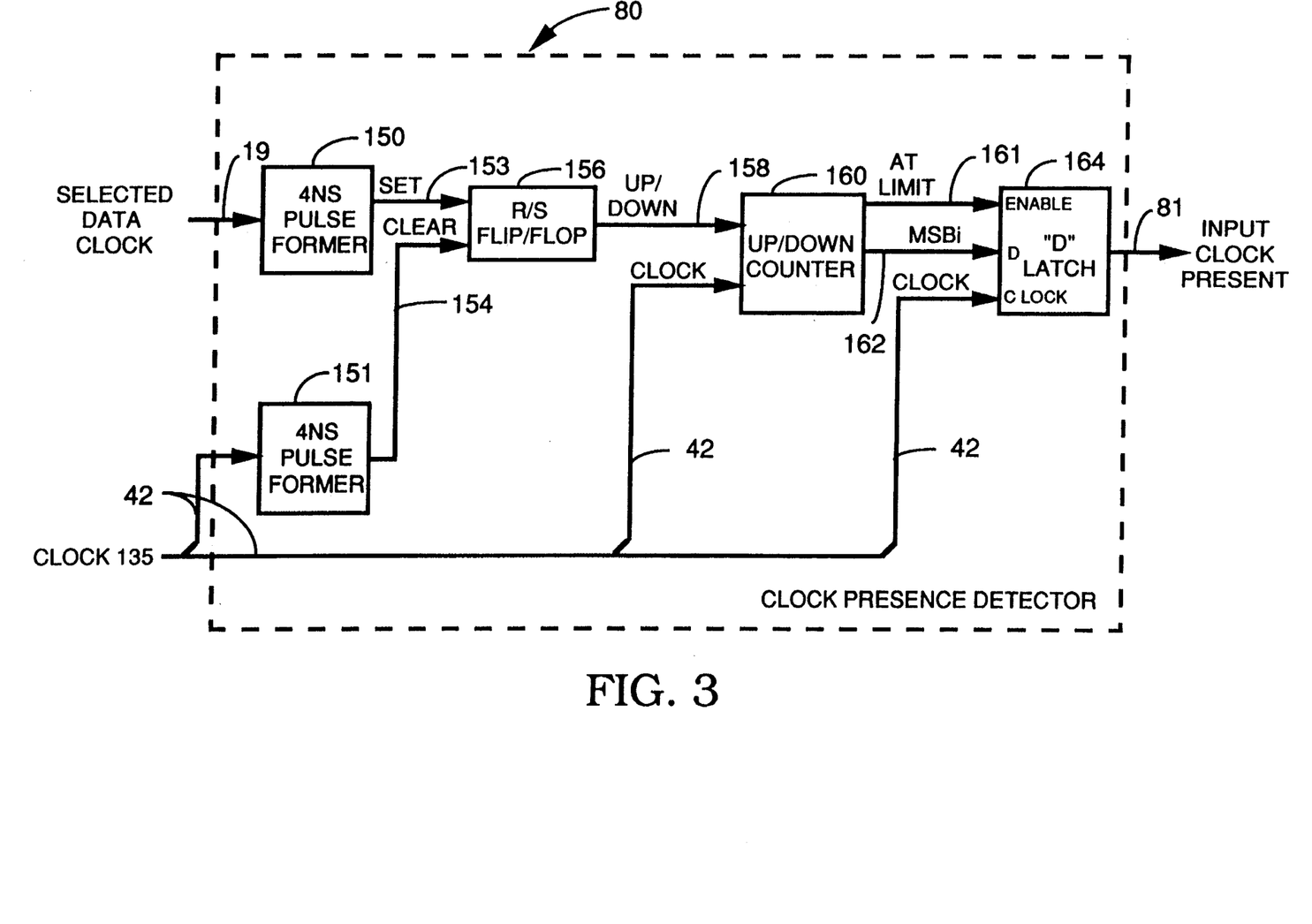
FIG. 3 is a block diagram of the clock presence detector used in the system of FIG. 1.

In accordance with the present system, there is provided a data clock presence detector circuit 80 suitable for implementation inside of a digital ASIC. As shown in FIG. 3, the clock presence detector 80 has two inputs, one being the selected data clock 19, and the other being the reference clock signal CLK135 (operating at 13.5 MHz) on lead 42, each of which are transmitted through 4 nanosecond pulse formers 150 and 151, respectively. The pulse formers 150 and 151 provide outputs over leads 153 and 154, respectively entitled "set" and "clear" which provide the two inputs to an R/S flip/flop 156. The output of flip/flop 156 is provided as an up/down count command over lead 158 to an up/down counter 160, which is clocked over lead 42 by the reference clock signal CLK135. The counter 160 provides two outputs to a latch 164 over leads 161 and 162, these output signals being designated "at limit" and "MSBi". The latch 164 provides the input clock present signal on output lead 81, which is the signal utilize in the previously described circuits.

The dock presence detector 80 utilizes the up/down counter 160 clocked by the reference clock signal CLK135 on lead 42, which operates at a nominal rate which is half of the nominal rate of the input data clock. The R/S flip-flop 156 causes the up/down counter 160 to count up when set via the input on lead 153 from the selected data clock signal on lead 19, and to count down when reset or cleared via the reference clock signal CLK135 on lead 42. In other words, the R/S flip-flop 156 is cleared by the reference dock and set by the input data clock. The counter 160 is configured to count up to its maximum number and stay at that maximum count when continuously clocked up by the continuous sensing of the input or selected data dock on lead 19. Similarly, when continuously clocked down, the counter reaches its minimum number (zero) and stays at it. If the input or selected data clock on lead 19 is present and has the correct rate, after each reference clock pulse (CLK135 on lead 42) resetting the flip-flop 156 and preparing the counter 160 to count down, there is at least one input or selected data clock pulse on lead 19 that sets the flip-flop 156 and prepares the counter 160 to count up. It is important to note, that due to propagation delays in pulse former 151 and in flip-flop 156, a change on the output of the flip-flop 156 caused by the reference clock is delivered to the up/down counter 160 after the counter is docked up by the same clock pulse that caused the change. As a result, each reference clock pulse thereafter is counted up, and eventually the counter reaches its maximum number indicating presence of the input data clock on output lead 81. In the absence of the input or selected data clock signal on lead 19 the R/S flip-flop 156 remains cleared or reset, whereupon the reference clock pulses (CLK135 on lead 42, via lead 154) are counted down, and eventually the counter 160 reaches its minimum indicating the absence of the input data clock on lead 81. The "at limit" signal is output from the Up/Down counter 160 on lead 161 to the latch 164 when it reaches its maximum or minimum count (zero). The MSBi (Most Significant Bit) output signal on lead 162 from the counter 160 differentiates between the maximum count and zero. The At Limit signal 161 enables latching the value of the MSBi signal 162 in the latch 164 by the dock 42. The latched value is output from latch 164 as the Input Clock Present signal 81. With a maximum count, the latch 164 provides a true output on lead 81, indicating presence of the input data clock, while at a minimum count, the latch 164 provides a false output on lead 81 indicating the absence of the input data clock.

With a significant difference between the reference clock signal CLK135 on lead 42 versus the input or selected data clock 19 (e.g., the reference clock being one-half the data clock), if the input or selected data clock 19 is present, each reference clock pulse on lead 42 is preceded by at least one input clock pulse on lead 19, no matter what the phase relationship between the two clocks. Therefore, each reference clock pulse (CLK on lead 42) arrives when the R/S flip/flop 156 has been set by the input data clock pulse, causing the up/down counter 160 to count up, and eventually reach the maximum count indicating input clock presence on lead 81. The up/down counter must be at least two bits long. The longer it is (i.e., greater number of bits), the greater the integration period and response time of the clock presence detector 80.

Phase Change Detection and Flywheel Phasing Circuit

Figure 4:
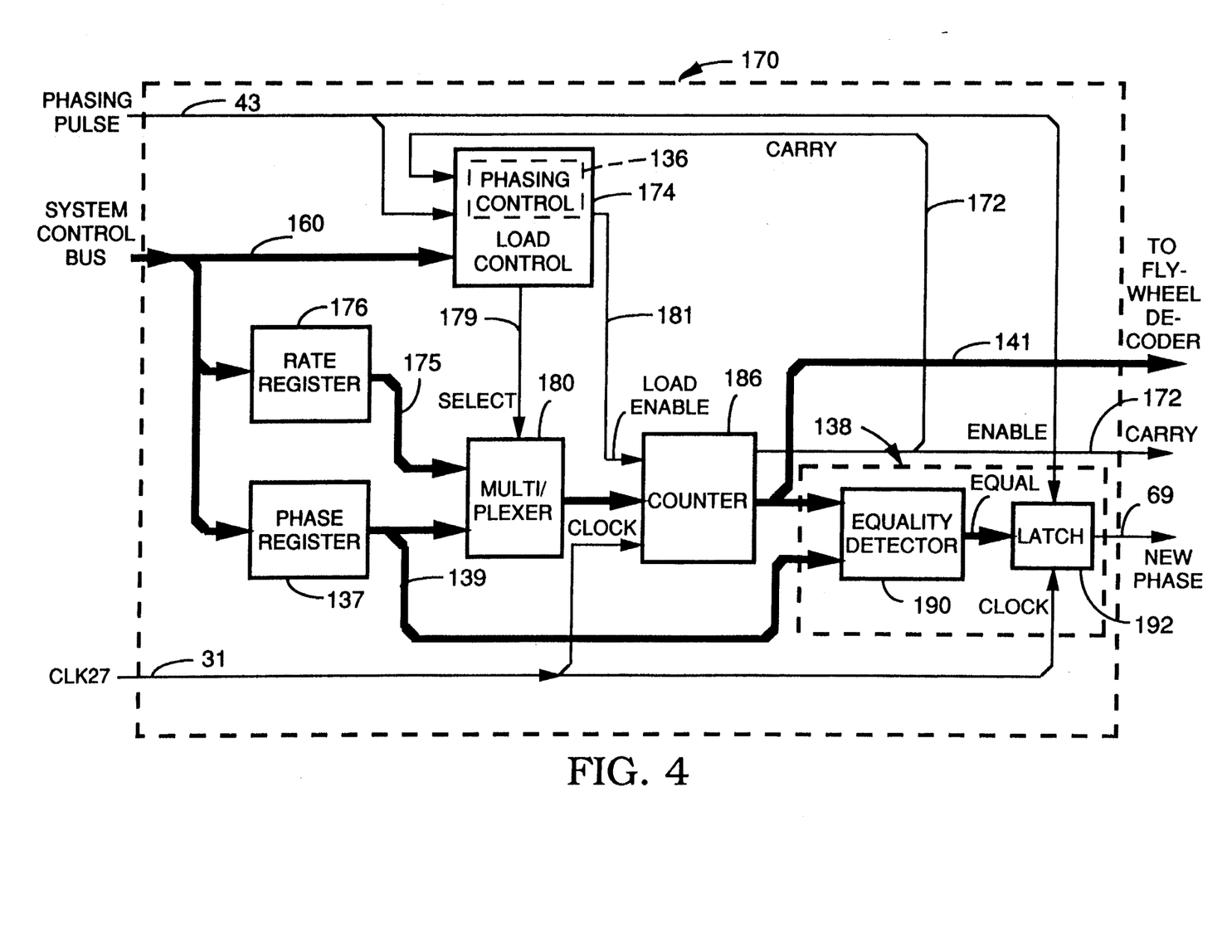
FIG. 4 is a modified block diagram of a flywheel circuit phasing arrangement with more detail of the phase change detector for the flywheel circuits of the system of FIG. 1, which diagram, in part, is similar to the block diagram of FIG. 2B.

Referring now to FIG. 4, the details pertaining to the phase change detection and its associated circuitry will be described. The phase change detection circuit is shown in broken lines, designated 138, within a flywheel circuit formed as a larger block enclosed in broken lines and generally designated 170. For purposes of explanation, the block 170 is generally equivalent to the horizontal flywheel circuit 60A of FIG. 2B, absent the horizontal flywheel decoder 135, and absent the VCO 140 (although the clock output thereof shows as a CLK27 input on lead 31 in FIG. 4). The detector 138 detects a change of phase relationship between the input video signal and the flywheeled sync signals on leads 61–64 (See FIGS. 1A and 2B) using an equality detector 190 for comparing the state of the flywheel counter 186 to the state of the phase register 137. The flywheel circuitry 170 has three inputs, these being, respectively, the phasing pulse on lead 43, data from the system control bus 160 (which includes the internal control bus 28) and the regenerated clock signal CLK27 on lead 31 (the VCO 140 output of FIG. 2B). There are three outputs, these being respectively designated "new phase" on lead 69, "carry" on lead 172, and "to flywheel decoder" on line 141, this line corresponding to the output of the flywheel counter 134 in FIG. 2B.

Data and signals on the system control bus 160 are input to a load control 174, a rate register 176 and the phase register 137. The phasing pulse on lead 43 is provided as a second input to the load control 174 and as an input to the new phase latch 192. The clock signal CLK27 on lead 31 is provided as a clocking input to a counter 186 and the new phase latch 192. The data output from the rate register 176 is provided as a first input over line 175 to a multiplexer 180, the other input of which is received from the phase register 137, via line 139, which data is also provided as an input to an equality detector 190. As indicated by the broken line enclosure, the equality detector 190 plus the latch 192 is identical to the phase change detector 138 of FIG. 2B. The load control 174 provides a first output signal, designated "select" to multiplexer 180, via lead 179, and a second signal, designated "load enable" to counter 186, via lead 181. The counter 186 outputs a "carry" signal on lead 172, along with its data value via line 141 to the equality detector 190, as well as to the flywheel encoder, as previously described.

FIG. 4 is a functional variation of the flywheel circuit 60A of FIG. 2B with more details in those blocks of FIG. 2B needed for facilitating explanation of the phase change detection and rephasing enablement operation. In FIG. 4, the flywheel counter block 134 has been expanded to show internal details, such as a rate register 176, and a multiplexer 180. The flywheel counter block 134 also includes part of the load control 174 shown in FIG. 4. The load control 174 of FIG. 4 also includes the phasing control 136 of FIG. 2B, that is, part of the load control 174 is shown in FIG. 2B as the phasing control 136.

The "carry" signal on lead 172 is the ripple carry output of the counter 186. It is used to reinitialize the counter 186, via load control 174, with the number or value from the rate register 176, from which the counter 186 counts up; that number effectively determining the flywheel rate. The "carry" signal on lead 172 is a functional name given to a generic signal which, for the instant function, is comprised of the horizontal sync signal on lead 62 (See FIGS. 1A and 2B). The Horizontal Sync signal, on lead 62 serves several purposes, one of which is to provide the "carry" signal from the counter 186. It is used internally by the Horizontal Flywheel Circuit, as well as a clock enable input to the Frame Flywheel Circuit, as well as an output from the Input Deformatter ASIC.

For purposes of detection of phase shift, the microprocessor 150 loads the phase register 137 with a value representing the desired phase. At the time when the horizontal phasing pulse arrives on lead 52, that value is loaded into the counter which normally continues to count from that number up to some maximum number. The loading of this value is determined by the select signal on lead 179 which causes the multiplexer 180 to select the contents of the phase register 137 for transfer to the counter 186 on occurrence of the load enable pulse on lead 133 originated by the phasing pulse on lead 164.

The contents of the Rate Register 176 determine the minimum number to which the counter is reset after it reaches its maximum and produces a carry output on lead 172. The carry output is fed to the Load Control block 174, which drives the Select input of the multiplexer 180 via line 179 and forces the multiplexer 180 to select the Rate Register 176 as the source of a number to be loaded into the counter 186. At the same time the Load Control 174 produces a load enable pulse to the counter 186 via line 181 causing the next incoming clock pulse from line 31 to finally load the number into the counter 186. Soon after, the load enable signal on lead 181 ends and counter 186 resumes counting up until it reaches its maximum again. The above described cycle is continually repeated so long as phasing is disabled. In this case the Load Control 174 doesn't respond to the phasing pulses on lead 43. But every phasing pulse on lead 43 serves as a clock enable for the latch 192, which is part of the Phase Change Detector 138. The latch 192 stores the result of a comparison between the counter 186 and the Phase Register 137 produced by the Equality Detector 190 at that time. If the numbers in counter 186 and register 137 are not equal, the New Phase output on lead 69 of latch 192 is seen by the microprocessor 150 as a phasing request. In response, the microprocessor 150 checks the parameters of the incoming data signal as previously described, and, if the data clock is present, the data sync is present and the sync error rates are low, it enables the flywheel phasing by sending an appropriate command to the Load Control 174 via system control bus 160. When the next phasing pulse on lead 43 comes to the Load Control 174, the Load Control 174 produces Select signal on lead 179 to the multiplexer 180, which makes the multiplexer select the output of the Phase Register 137 as a source of the number to be loaded into the counter 186. At the same time the Load Control 174 produces a load enable pulse to the counter 186 via line 181 causing the next coming clock pulse from line 31 to finally load the number into the counter. Soon after, the load enable 181 ends and counter 186 resumes its normal counting cycle.

In accordance with the present invention there has been shown and described a method and apparatus for input data clock presence detection. Although the description has been applied to a specific embodiment in which the reference clock operates at a different and slower rate than the input data clock, both signals can operate at the same rate so long as they are not concurrent, that is, provided there is a time delay between the signals to enable the setting and clearing of the flip-flop with both clock signals present. While there has been shown and described a preferred embodiment, it is to be understood that various other adaptations and modifications may be made within the spirit and scope of the invention.

I claim:

1. Apparatus for detecting presence of the input data clock signal accompanying an incoming digital video signal, said apparatus comprising:

a flip-flop for receiving, as a first input, said input data clock signal, and, as a second input, a reference clock signal, said signals being such that said reference clock signal precedes an input data clock signal in normal operation with both signals present, and wherein said reference clock signal has a rate less than the rate of said input data clock signal;

counter means responsive to said reference signal and the output of said flip-flop for counting in a first direction to a first limit in response to presence of said input data clock signal and for counting in the opposite direction to a second limit in response to absence of said input data clock signal, said counter means providing one of first and second outputs indicative of one of said first and second limits being reached;

latch means responsive to one of said first and second outputs of said counter means for indicating the presence or absence of said input data clock signal.

2. Apparatus for detecting presence of the input data clock accompanying an incoming digital video signal, said apparatus comprising:

a flip-flop adapted for receiving said input data clock signal as a first input;

means for providing a reference clock signal as a second input to said flip-flop, said reference clock signal having a rate significantly less than the rate of said input data clock;

an up/down counter clocked by said reference clock and receiving the output of said flip-flop causing said counter to count up after being set by said input data clock and to count down after being cleared by said reference clock signal, said counter being configured to remain at its maximum or minimum value, once reached, notwithstanding receipt of additional clock signals after reaching one of said maximum or minimum values latch means; and output means from said counter for indicating to said latch means that the counter has reached a maximum of minimum value limit and for indicating which limit.

3. The apparatus according to claim 2 wherein said latch means provides an input clock present signal only when said output means signifies said counter has reached its maximum limit.

4. The apparatus according to claim 3 further including means for clearing said input clock present signal only when said output means signifies said counter has reached its minimum limit.

5. Apparatus for detecting presence of the input data clock signal accompanying an incoming digital video signal, said apparatus comprising:

a flip-flop for receiving, as a first input, said input data clock signal, and as a second input, a reference clock signal having a rate significantly less than the rate of said input data clock;

an up/down counter clocked by said reference clock signal and receiving the output of said flip-flop, said flip-flop causing said counter to count up on receipt by said flip-flop of said first input and to count down on receipt by said flip-flop of said second input, said counter being configured to remain at its maximum or minimum value, once reached, notwithstanding receipt of additional clock signals after reaching one of said maximum or minimum values;

latch means; and output means from said counter for indicating to said latch means that the counter has reached a maximum or minimum value limit and for indicating which limit.

6. A method for detecting presence of the input data clock pulses accompanying an incoming digital video signal, said method comprising:

providing a resettable two input flip-flop;

inputting, as a first input, said input data clock pulse;

inputting as a second input, a reference clock pulse having a rate less than the rate of said data clock pulse, said pulses being such that said reference clock pulse precedes an input data clock pulse in normal operation with both signals present;

providing counter means;

clearing said flip-flop on receipt of a reference clock pulse for enabling counting by said counter means in response to said reference pulse and the output of said flip-flop for counting in a first direction to a first limit;

setting said flip-flop on receipt of an input data clock pulse for enabling counting by said counter means in the opposite direction to a second limit;

outputting from said counter means one of first and second outputs indicative of one of said first and second limits being reached; and storing one of said first and second outputs of said counter means for indicting the presence or absence of said input data clock signal.

* * * * *